United States Patent [19]

Bloemer

[11] Patent Number: 5,151,956
[45] Date of Patent: Sep. 29, 1992

[54] WAVEGUIDE POLARIZER USING LOCALIZED SURFACE PLASMONS

[75] Inventor: Mark J. Bloemer, Athens, Ala.

[73] Assignee: The United States of America as represented by the Secretary of the Army, Washington, D.C.

[21] Appl. No.: 811,279

[22] Filed: Dec. 20, 1991

[51] Int. Cl.⁵ .............................. G02B 6/00; G02B 6/36
[52] U.S. Cl. ........................................................ 385/11
[58] Field of Search .......................... 385/11, 2, 3, 4, 5

[56] References Cited

U.S. PATENT DOCUMENTS

| | | | |
|---|---|---|---|
| 4,221,460 | 9/1980 | Hepner et al. | 385/11 X |
| 4,384,760 | 5/1983 | Alferness | 385/11 |
| 4,898,441 | 2/1990 | Shimizu | 385/11 |
| 4,966,431 | 10/1990 | Heismann | 385/11 |
| 5,077,822 | 12/1991 | Gremer | 385/11 X |
| 5,117,469 | 5/1992 | Cheung et al. | 385/11 |

OTHER PUBLICATIONS

R. H. Ritchie, Surface Science 34 (1973) 1–19.
S. W. Kennerly, J. W. Little, R. J. Warmack, and T. L. Ferrell, Phys. Rev. B 29, 2926 (1984).
M. J. Bloemer, T. L. Ferrell, M. C. Buncick, and R. J. Warmack, Phys. Rev. B 37, 8015 (1988).
M. J. Bloemer, M. C. Buncick, R. J. Warmack, and T. L. Ferrell, J. Opt. Soc. Am B 5, 2552 (1988).
H. Nisahihara, M. Haruna, T. Suhara, Optical Integrated Circuits (McGraw-Hill, New York, p. 257, 1989).
M. N. Zervas and I. P., Giles, Opt. Lett. 15, 513 (1990).

*Primary Examiner*—Akm E. Ullah
*Attorney, Agent, or Firm*—Hugh P. Nicholson; Freddie M. Bush

[57] ABSTRACT

Surface plasmon resonance in small particles of metal is employed to polarize light propagating in a waveguide. An ion-exchanged glass waveguide is provided with a 50 Angstrom (5 nm) mass thick layer of silver which is deposited on the waveguide. The ion-exchanged glass waveguide having the specified layer of silver is annealed at 200° C. for 1 minute causing the silver film to bead, much like water droplets on a waxed car. The silver microparticles have a nonspherical shape with their major axes parallel to the surface of the waveguide and their minor axis perpendicular to the surface of the waveguide as illustrated in the Figures of the Drawing. When light from a HeNe laser at a wavelength of 633 nm is prism-coupled into the waveguide with the field of laser beam parallel to the major axes of the spheroids (TE polarization) the laser light is strongly absorbed and the TM light is passed.

11 Claims, 1 Drawing Sheet

WAVEGUIDE POLARIZER USING LOCALIZED SURFACE PLASMONS

DEDICATORY CLAUSE

The invention described herein may be manufactured, used, and licensed by or for the Government for governmental purposes without the payment to me of any royalties thereon.

BACKGROUND OF THE INVENTION

Interactions in accordance with coulomb's law between conduction electrons in massive metals provides the basis for a collective excitation branch to exist that is related to the oscillation of the charge density (volume plasmons). In bounded metal samples beside volume plasmons with the frequency:

$$\omega_O = \sqrt{\frac{4\pi\eta\epsilon^2}{m}}$$

wherein $\eta$ is electron density, $\epsilon$ and $m$ are the charge and rest mass, respectively, of the electron, there exist surface plasmons related to oscillations of the surface charge density. For example, in metal spheres a set of surface plasmon oscillations may be excited characterized by the multipolarity L of their eigenfunctions. The frequencies of these plasmons are defined by the equation:

$$\omega_L = \omega_O \sqrt{\frac{L}{2L-1}}$$

wherein $\omega_O$ is as identified hereinabove and L is multipolarity. The result of the above equation is valid for sufficiently large particles.

The above background information is well documented in the literature. A compilation of a wide cross-section of activity on electromagnetic surface modes is found in "Electromagnetic Surface Modes", edited by A. D. Boardman, copyright 1982 by John Wiley & Sons Ltd. The physical properties of bulk matter when fragmentation of the bulk matter has taken place is very striking in the effect to the charges in electromagnetic characteristics of metals of their behavior in external electromagnetic fields. Their behavior in external electromagnetic fields is determined mainly by the collective motion of conduction electrons which is affected strongly by their scattering on particle boundaries. The teaching, as noted in Chapter 8, of citation edited by Boardman, titled: "Electromagnetic surface modes in small metallic particles" by A. A. Lushnikov et al, indicates that the role of scattering on particle boundaries increases as the size of the particle decreases.

The extensive investigations of small (1-10 nanometers, nm) metal particles have been of great interest in research in the field of physics as evidenced in the increasing application of dispersed materials. However, many experimental investigations of small metal particles when subjected to an external electromagnetic field have revealed the existence of some anomalies. In attempts to meet the need to understanding these anomalies a number of theoretical approaches have ensued which conclude that a small metal particle is considered as a bounded gas of free conduction electrons. The model developed is the so-called jellium model which in combination with random phase approximation (RPA) yields a systematic account of the quantum mechanical theory of the electromagnetic properties of small metal particles. Chapter 8, Section 4 by Lushnikov et al (cited hereinabove) is devoted to a study of the size dependence of the surface plasmon peak position in small metal particles.

As a result of recent studies by applicant and others (Kennerly et al, Phys. Rev. B 29, 2926 (1984); Bloemer et al, Phys. Rev. B 37, 8015 (1988); and Bloemer et al, J. Opt. Soc. Am. B5, 2552 (1988)), the optical properties of heated silver films, optical properties of submicrometer-size silver needles, and surface electromagnetic modes in prolate spheroids of gold, aluminum, and copper have shown that small oblate and prolate spheroidal particles support two surface plasmon modes. One of the surface plasmon modes is a dipole oriented along the major axis of the spheroid while the other is a dipole oriented along the minor axis of the spheroid.

The above background information and noted research in the field of physics have provided applicant the motivation to apply the results of research to utilize the surface plasmon resonance in submicrometer-size particles to polarize electromagnetic radiation.

Therefore, an object of the invention is to provide a waveguide polarizer which utilizes localized surface plasmon resonances in submicrometer-size particles to polarize electromagnetic radiation.

Another object of this invention is to provide submicrometer metallic particles which are nonspherical in order to have the anisotropy required for polarizers.

A further object of this invention is to provide metallic particles which are positioned in a waveguide so that the metallic particles can be reached by the electromagnetic field propagating in the waveguide whereby a portion of the electromagnetic radiation is absorbed and a portion is passed to achieve polarization.

SUMMARY OF THE INVENTION

Surface plasmon resonance in small metal particles is utilized to polarize light propagating in a waveguide. The metal particles are formed into nonspherical shapes in order to provide the anisotropy required to polarize electromagnetic radiation. The metal particles are placed in the core of the waveguide, in the cladding, or on the cladding. The electromagnetic field propagating in the waveguide must extend to where the metal particles are located to achieve polarization.

The polarizing properties of a planar waveguide were evaluated experimentally in sample which employed silver microparticles formed on an ion-exchanged glass waveguide. The ion-exchanged glass waveguide is provided with a 50 Angstrom (5 nm) mass thick layer film of silver deposited on the surface. The test sample is annealed at 200° C. for 1 minute causing the silver film to bead, much like droplets on a waxed car. The silver particles are modeled as oblate spheroids. The particles have their major axes parallel to the surface of the waveguide and their minor axes perpendicular the surface of the waveguide. Light from a HeNe laser at a wavelength of 633 nanometers is prism-coupled into the waveguide. When the electric field of the laser is parallel to the major axes of the spheroids (TE polarization) the light is strongly absorbed. For the orthogonal polarization the light is not absorbed. The extinction ratio is >30 dB/cm. Much larger extinction ratios are possible for wavelengths closer to the surface plasmon resonance.

DESCRIPTION OF THE PREFERRED EMBODIMENT(S)

The surface plasmon resonance in small metal particles having a predetermined shape and size is used to polarize light propagating in a waveguide.

Silver microparticles are formed on an ion-exchanged planar glass waveguide in accordance with the following described procedure. A 50 Angstrom (5 nm) mass thick layer of silver is deposited on the specified waveguide. The sample is annealed at 200° C. for 1 minute causing the silver film to bead, much like water droplets on a waxed car.

Figure 1:
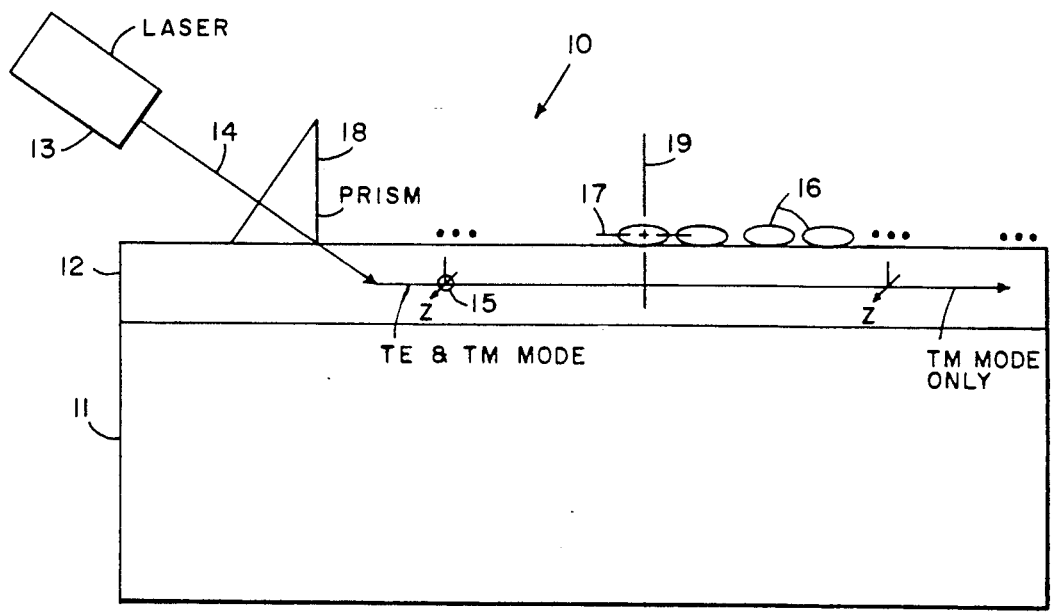
FIG. 1 of Drawing depicts a waveguide polarizer employing silver microparticles on the surface of an ion-exchanged glass waveguide.
Figure 2:
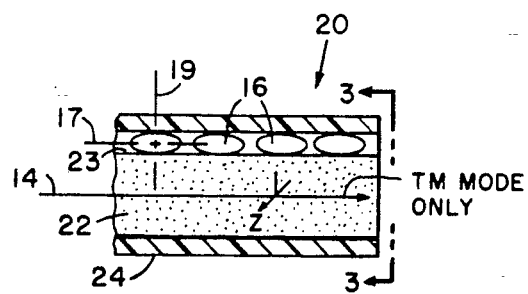
FIG. 2 of Drawing depicts submicrometer-size metallic particles on a fiber-optic waveguide.
Figure 3:
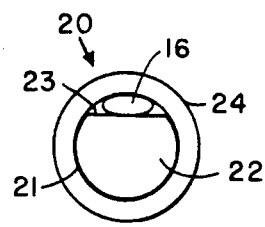
FIG. 3 of Drawing depicts an end view along lines 3—3 of FIG. 2.

In further reference to FIG. 1 of the Drawing, a waveguide polarizer 10 depicts an ion-exchanged glass waveguide 12 on a substrate portion 11 with a waveguide portion on the top surface of about 2 microns thickness. The silver particles 16 formed by the annealing process have a particle shape which is nonspherical in order to have the anisotropy required for polarizers. Although the metal particles are depicted on the outer surface of the waveguide, the metal particles can be in the core of the waveguide, in the cladding, or on the cladding. The only requirement of the location of the metal particles is that the electromagnetic field propagating in the waveguide extend to where the particles are located. For illustration, FIGS. 2 and 3 depict submicrometer-size metallic particles 16 which are deposited where a portion of the cladding 21 has been removed at a location 23. A dielectric material 24 is shown surrounding the fiber-optic material 22, cladding 21, and submicrometer-size metallic particles 16 of a fiber-optic waveguide 20. TM mode is shown as being passed and TE mode absorbed (not shown).

The operational waveguide polarizer of FIG. 1 depicts a waveguide layer 12 receiving a laser beam 14 from a laser 13 prism-coupled into the waveguide 12 by prism 18. The laser beam is polarized by the surface plasmon resonance of the silver microparticles. The silver microparticles are depicted as having their major axes 17 parallel to the surface of the waveguide and their minor axes 19 perpendicular to the surface of the waveguide. Prior to passing the silver microparticles the laser beam depicts presences of both TE and TM modes; however, the TE mode is fully absorbed and the TM mode is passed as shown in FIG. 1. Thus, when the electrical field of the laser beam is parallel to the major axes of the sheroids, the transverse electric (TE) polarized light is strongly absorbed. The transverse magnetic (TM) polarized light is passed. The circular designation 15 around the laser beam designates the direction of the electrical field plane which is directed along the Z axis or out of surface normal to plane of paper toward viewer. By orienting the silver microparticles with the major axes perpendicular to the surface of the waveguide TM light will be absorbed and TE light will pass. Thus, changing the orientation of the nonspherical particles by 90 degrees changes the polarization state absorbed and passed.

The potential materials and waveguide geometries are further discussed hereinbelow. The waveguide polarizers utilizing a surface plasmon resonance in accordance with the invention is not limited to visible wavelengths. The spectrum ranges of ultraviolet (UV), visible, and infrared (IR) (near, middle, and far infrared) are listed below in Table I Spectrum, both in nanometers (nm) and microns ($\mu$) for convenience in reviewing Table II. Table II, Microparticles of Metals and Waveguide Polarizers Using Surface Plasmon Resonances, indicates metals, shape of metal microparticles, and the resonances ranges both in nanometers and microns.

TABLE I

SPECTRUM, UV, VISIBLE AND IR

| Spectrum | Range Wavelength in nm | Range Wavelength in $\mu$ |
| --- | --- | --- |
| UV | 20–380 | 0.02–0.38 |
| Visible | 397–723 | 0.397–0.723 |
| IR (near) | 750–1500 | 0.750–1.5 |
| IR (middle) | 1500–10,000 | 1.5–10 |
| IR (far) | 10,000–1,000,000 | 10–1,000 |

TABLE II

Microparticles of Metals and Waveguide Polarizers Using Surface Plasmon Resonances*

| Size, nm | Particle Shapes | Resonance Ranges in Increasing Wavelengths and Metal Microparticles Wavelengths of Spectrums listed |
| --- | --- | --- |
| Silver, up to 500 nm | prolate spheroids** | 300–2,000 nm |
| Gold, up to 500 nm | any nonspherical | visible–near IR |
| Copper, up to 500 nm | any nonspherical | visible–near IR |
| Aluminum, up to 500 nm | any nonspherical | UV–visible |

*Waveguide polarizers utilizing a surface plasmon resonance is not limited to visible wavelengths.
**The particle shapes do not need to be prolate spheroids or oblate spheroids, any nonspherical particles can be used.

The microparticles of Table II can be fabricated by many techniques in addition to heating of metal island film as described for fabrication of the silver microparticles employed in sample specified. Such additional methods of fabrication of microparticles include electron beam lithography, oblique evaporation on a roughened substrate or patterned substrate, normal incident evaporation through a monolayer of polystyrene spheres, etc.

The particles can be any size up to 500 nanometers. Particles larger than 500 nanometers will have a scattering cross section at least as large as the absorption cross section. Usually large amounts of scattered light is undesirable.

Waveguide polarizers described hereinabove are not limited to planar glass waveguides which are fabricated by a standard Na-Ag exchange process which uses an optical grade glass such as BK7. The composition of BK7 glass, the ion-exchange process, and fabrication technique of making planar glass waveguides are well known as disclosed in Journal of Lightwave Technology, V. 7, No. 10, Oct. 1989, pages 1590–1596, "Low-Loss Small-Mode Passive Waveguides and Near-Adiabatic Tapers in BK7 Glass" by Huo Zhenguang et al. Channel waveguides can be used as well. In addition any type of waveguide material is suitable, especially attractive are waveguides made of optical fibers and III-V semiconductor compounds. Some useful nomenclature: The semiconductor compounds of chemical formula AB, where A is a trivalent element and B is pentavalent element, are called III-V (three-five) compounds. Examples are indium antimonide and gallium arsenide. (Page 183, Chapter 8: Semiconductor, Crystals, Introduction to Solid State Physics by Charles Kittel, 1986). For optical fibers the particles can be deposited directly onto the cladding or part of the cladding can be removed before deposition of the particles.

The applications for waveguide polarizers are numerous. For example, waveguide polarizers are useful in many intergrated optics devices and optical fiber communication systems. Most interferometric devices require highly polarized light. Polarized light is especially important for optical gyroscopes which can be used for navigation.

I claim:

1. A waveguide polarizer utilizing the surface plasmon resonances in submicrometer-size metallic particles to polarize electromagnetic radiation comprising:
   (i) a waveguide substrate for supporting said submicrometer-size metallic particles within an electromagnetic field of electromagnetic radiation propagating said waveguide polarizer;
   (ii) submicrometer-size metallic particles selected from the group of metals consisting of silver, gold, copper, and aluminum deposited within said electromagnetic field and supported by said waveguide substrate, said submicrometer-size metallic particles having nonspherical shapes and having their major axes parallel to the surface of said waveguide substrate, said nonspherical shapes of submicrometer-size metallic particles having particles size up to 500 nanometers as measured along side of major axes, said nonspherical shapes of submicrometer-size metallic particles having a predetermined minor to major axis ratio and having two surface plasmon modes with each of said surface plasmon modes having a surface plasmon resonance within the wavelength of electromagnetic radiation propagating in said waveguide, said surface plasmon resonance wavelength achieving polarization of electromagnetic radiation by absorbing the wavelength of said electromagnetic radiation of plasmon resonance wavelength of one of said surface plasmon modes and passing the wavelength of said electromagnetic radiation of the surface plasmon resonance wavelength of the other of said surface plasmon modes, said electromagnetic radiation wavelength when impinging on said nonspherical shapes of submicrometer-size metallic particles with its electric field parallel to said major axis being passed and said electromagnetic radiation wavelength when impinging on said nonspherical shapes of submicrometer-size metallic particles with its electric field parallel to said minor axis being absorbed to thereby achieve polarization of said electromagnetic radiation propagating said waveguide.

2. The waveguide polarizer as defined in claim 1 wherein said waveguide substrate is an ion-exchanged planar glass substrate and wherein said submicrometer-size metallic particles deposited within said electromagnetic field of said waveguide substrate are formed from a 50 Angstrom mass thick layer in the form of a film first deposited on said waveguide substrate and subsequently annealed at 200° C. for 1 minute causing said silver film to bead and to form silver particles having the shape of oblate spheroids, said silver particles having their major axes parallel to the surface of said waveguide substrate and having their minor axes perpendicular to the surface of said waveguide substrate and wherein said waveguide polarizer has surface plasmon resonances wavelengths which range from about 300 to about 2,000 nanometers.

3. The waveguide polarizer as defined in claim 2 when irradiated by a HeNe laser at a wavelength of 633 nanometers prism-coupled into said waveguide polarizer with the electric field of the laser parallel to said major axes of said oblate spheroid, TE polarized light is absorbed and TM polarized light is passed, and when irradiated by said HeNe laser with the electric field of the laser perpendicular to said major axes of said oblate spheroids, TE polarized light is passed and TM polarized light is absorbed.

4. The waveguide polarizer as defined in claim 2 wherein said silver particles have a minor to major axis ratio of 0.16 and have surface plasmon resonances at a wavelength of 470 nanometers and 340 nanometers and when irradiated with electromagnetic radiation at a wavelength of 470 nanometers impinging on said silver particles with the electric field of said electromagnetic radiation parallel to said major axis of said oblate spheroid said wavelength of 470 nanometers is absorbed and when said electromagnetic radiation with its electric field parallel to said minor axis of said oblate spheroids said wavelength of 470 nanometers is passed.

5. A method for fabrication of a waveguide polarizer utilizing the surface plasmon resonance in submicrometer-size metallic particles to polarize electromagnetic radiation, said method comprising:
   (i) providing a waveguide substrate selected from the group consisting of planar glass waveguides, optical fibers waveguides, and III-V semiconductor compound waveguides for supporting said submicrometer-size metallic particles within an electromagnetic field of electromagnetic radiation propagating said waveguide polarizer;
   (ii) submicrometer-size metallic particles formed from a metal selected from the group of metals consisting of silver, gold, copper, and aluminum deposited on said waveguide substrate, said submicrometer-size metallic particles deposited by a method to achieve forming nonspherical particles of up to about 500 nanometers as measured along the major axis of said nonspherical particles deposited on said waveguide substrate, said nonspherical shaped submicrometer-size metallic particles having a predetermined minor to major axis ratio and having two surface plasmon modes with each of said surface plasmon modes having a surface plasmon resonance within the wavelength of electromagnetic radiation propagating in said waveguide, said surface plasmon resonance wavelength achieving polarization of electromagnetic radiation by absorbing the wavelength of said electromagnetic radiation of the surface plasmon resonance wavelength of one of said surface plasmon modes and passing the wavelength of said electromagnetic radiation of the surface plasmon resonance wavelength of the other of said surface plasmon modes, said electromagnetic radiation wavelength when impinging on said nonspherical shaped submicrometer-size particle with its electric field parallel to said major axis being passed and said electromagnetic radiation wavelength when impinging on said nonspherical shaped submicrometer-size metallic particles with its electric field parallel to said minor axis being absorbed to thereby achieve polarization of said electromagnetic radiation propagating said waveguide.

6. The method for fabrication of a waveguide polarizer as defined in claim 5 wherein said submicrometer-size metallic particles are deposited by employing a method to fabricate said particles selected from the group of methods consisting of depositing and heating and annealing of a metal island film to cause said metal island film to bead and form said submicrometer-size metallic particles on said waveguide substrate, electron beam lithography, oblique evaporation on a roughened substrate or pattern substrate, and normal incident evaporation through a monolayer of polystyrene spheres.

7. The method for fabrication of a waveguide polarizer as defined in claim 6 wherein said metal said selected is silver and wherein said selected method to fabricate said particles is by depositing, and heating and annealing of said metal island film deposited on said waveguide substrate to cause said metal film to bead and form nonspherical particles of silver metal having their major axes parallel to the surface of said waveguide substrate and parallel to an electric field of an impinging electromagnetic radiation and have their minor axes perpendicular to the surface of said waveguide substrate, said waveguide polarizer with major and minor axes of nonspherical particles oriented as set forth above absorbing TE polarized light and passing TM polarized light, said waveguide polarizer when major and minor axes of said nonspherical particles are changed by 90 degrees to said impinging electromagnetic radiation changing the polarization state takes place by absorbing TM polarized light and passing TE polarized light.

8. The method for fabrication of a waveguide polarizer as defined in claim 7 wherein said nonspherical metallic particles of silver metal are prolate spheroids of silver having resonances ranging from 300–2,000 nanometers depending on said minor to major axis ratios of said nonspherical particles deposited on said waveguide substrate.

9. The method for fabrication of a waveguide polarizer as defined in claim 6 wherein said metal selected is gold and wherein said nonspherical particles of gold metal are prolate spheroids of gold having surface plasmon resonances ranges from in the visible wavelengths into the near infrared wavelengths.

10. The method for fabrication of a waveguide polarizer as defined in claim 6 wherein said metal selected is copper and wherein said nonspherical particles of copper metal are prolate spheroids of copper having surface plasmon resonances ranges from in the visible wavelengths into the near infrared wavelengths.

11. The method for fabrication of a waveguide polarizer as defined in claim 6 wherein said metal selected is aluminum and wherein said nonspherical particles of aluminum metal are prolate spheroids of aluminum having surface plasmon resonances ranges from in the ultraviolet wavelengths into the visible wavelengths.

* * * * *